(12) United States Patent
Taniguchi

(10) Patent No.: US 10,708,652 B2
(45) Date of Patent: Jul. 7, 2020

(54) VIDEO DISPLAY SYSTEM, VIDEO DISPLAY METHOD, AND VIDEO DISPLAY PROGRAM

(71) Applicant: FOVE, INC., San Mateo, CA (US)

(72) Inventor: Shinji Taniguchi, Tokyo (JP)

(73) Assignee: FOVE, INC., San Mateo, CA (US)

( * ) Notice: Subject to any disclaimer, the term of this patent is extended or adjusted under 35 U.S.C. 154(b) by 0 days.

(21) Appl. No.: 16/038,293

(22) Filed: Jul. 18, 2018

(65) Prior Publication Data
US 2019/0064923 A1   Feb. 28, 2019

(30) Foreign Application Priority Data
Aug. 31, 2017   (JP) .................................. 2017-166923

(51) Int. Cl.
| H04N 21/442 | (2011.01) |
| H04N 13/383 | (2018.01) |
| H04N 21/218 | (2011.01) |
| H04N 21/6587 | (2011.01) |
| H04N 21/2343 | (2011.01) |
| H04N 13/344 | (2018.01) |
| G02B 27/01 | (2006.01) |

(52) U.S. Cl.
CPC ....... *H04N 21/44218* (2013.01); *G02B 27/01* (2013.01); *H04N 13/344* (2018.05); *H04N 13/383* (2018.05); *H04N 21/21805* (2013.01); *H04N 21/2343* (2013.01); *H04N 21/6587* (2013.01)

(58) Field of Classification Search
CPC ............. G02B 27/01; H04N 21/21805; H04N 21/2343; H04N 13/383; H04N 21/6587; H04N 13/344; H04N 21/44218
See application file for complete search history.

(56) References Cited

U.S. PATENT DOCUMENTS

| 2006/0256083 A1* | 11/2006 | Rosenberg | .............. G06F 3/013 345/156 |
| 2016/0260196 A1* | 9/2016 | Roimela | ................. G06F 3/013 |

* cited by examiner

*Primary Examiner* — Charles V Hicks

(57) ABSTRACT

An video display system having room in a generation time of a next frame to be generated on the basis of a gaze direction of the user is provided. A video display system includes a wearable device including a reception unit that receive a video, a display unit that displays the video received by the reception unit, an irradiation unit that irradiates eyes of a user with near infrared light, and an imaging unit that images the eyes of the user viewing the video displayed on the display unit, on the basis of the near infrared light, the user wearing the wearable device and viewing the video; a gaze detection unit that detects a gaze point of the user on the basis of a captured image captured by the imaging unit; and a video generation unit that generates a video to be displayed on the wearable device on the basis of the gaze point detected by the gaze detection unit, and the wearable device includes a control unit that instructs an imaging start timing to the imaging unit so that the imaging of the imaging unit can be executed at a timing at which it is estimated that the user is viewing the frame each time each frame of the video to be displayed on the display unit is displayed.

6 Claims, 9 Drawing Sheets

VIDEO DISPLAY SYSTEM, VIDEO DISPLAY METHOD, AND VIDEO DISPLAY PROGRAM

BACKGROUND OF THE INVENTION

Field of the Invention

The present invention relates to a video display system, a video display method, and a video display program for generating and displaying a video on the basis of a gaze point of a user.

Description of Related Art

In the related art, development of head mounted displays, wearable glasses, and the like as devices that are mounted on the head of a user to present videos has progressed, and some of these detect the gaze of the user. Japanese Unexamined Patent Application Publication No. 2015-90569 discloses an information processing device capable of detecting a gaze direction of a user, and discloses acquiring an image of the eyes of the user at every predetermined timing.

SUMMARY OF THE INVENTION

Meanwhile, such a detection of the gaze may be used, for example, in creation of video data of the next frame in a video. More specifically, for example, when a user is viewing a 360-degree video, video data of the next frame based on the gaze of the user is created and displayed. In this case, the gaze is specified using a captured image obtained by imaging the eyes of the user viewing the video, but in imaging at every predetermined timing, there is a problem in that the fact that a frame of the captured image is actually viewed by the user is not guaranteed. Since video data is prepared through a process of imaging the eyes of the user, analyzing a captured image obtained by the imaging, and specifying a gaze point in preparing the next frame, there is also a problem in that a usable time for preparing the video data is short.

The present invention has been made in view of the above problems, and an object of the present invention is to provide a video display system that can obtain a captured image of the eyes of a user viewing each frame more accurately and can secure a longer period of time for preparation of video data to be viewed by the user than in the related art.

In order to solve the above problem, a video display system according to an aspect of the present invention includes a wearable device including a reception unit that receive a video, a display unit that displays the video received by the reception unit, an irradiation unit that irradiates eyes of a user with near infrared light, and an imaging unit that images the eyes of the user viewing the video displayed on the display unit, on the basis of the near infrared light, the user wearing the wearable device and viewing the video; a gaze detection unit that detects a gaze point of the user on the basis of a captured image captured by the imaging unit; and a video generation unit that generates a video to be displayed on the wearable device on the basis of the gaze point detected by the gaze detection unit, wherein the wearable device includes a control unit that instructs an imaging start timing to the imaging unit so that the imaging of the imaging unit can be executed at a timing at which it is estimated that the user is viewing the frame each time each frame of the video to be displayed on the display unit is displayed.

In order to solve the above problem, a video display method according to an aspect of the present invention includes a reception step of receiving a video; a display step of displaying the video received in the reception step; an irradiation step of irradiating eyes of a user with near infrared light; a control step of instructing an imaging start timing so that imaging can be executed at a timing at which it is estimated that the user is viewing the frame each time the frame of the video to be displayed in the display step is displayed; an imaging step of imaging the eyes of the user viewing the video displayed in the display step, on the basis of the near infrared light according to the instructed start timing; a gaze detection step of detecting a gaze point of the user on the basis of a captured image captured in the imaging step; and a video generation step of generating a video to be displayed on the basis of the gaze point detected in the gaze detection step.

In order to solve the above-mentioned problems, a video display program according to one aspect of the present invention causes a computer to execute a reception function of receiving a video; a display function of displaying the video received using the reception function; an irradiation function of irradiating eyes of a user with near infrared light; a control function of instructing an imaging start timing so that imaging can be executed at a timing at which it is estimated that the user is viewing the frame each time the frame of the video to be displayed using the display function is displayed; an imaging function of imaging the eyes of the user viewing the video displayed using the display function, on the basis of the near infrared light according to the instructed start timing; a gaze detection function of detecting a gaze point of the user on the basis of a captured image captured using the imaging function; and a video generation function of generating a video to be displayed on the basis of the gaze point detected using the gaze detection step.

Further, in the video display system, the reception unit may convert video data of the received video into a format for displaying the video on the display unit, the display unit may output a synchronization signal indicating start of display of the video data converted by the reception unit, and the control unit may output, to the imaging unit, an instruction signal for instructing the start timing to the imaging unit on the basis of the synchronization signal.

In the video display system, the control unit may output the instruction signal according to a period of time from start of display of the frame on the display unit to viewing by the user.

Further, in the video display system, the control unit may further control a timing at which the irradiation unit irradiates the eyes of the user with the near-infrared light.

The video display system according to an aspect of the present invention can image the eyes of the user viewing the video more accurately by controlling the timing for imaging the eyes of the user. In addition, the video display system can give room for preparation of video data to be viewed next by advancing the start of the imaging timing relative to that in the related art through imaging timing control.

DETAILED DESCRIPTION OF THE INVENTION

DETAILED DESCRIPTION OF THE INVENTION

Hereinafter, embodiments of a video display system according to the present invention will be described with reference to the drawings.
<Embodiment>

Figure 1:
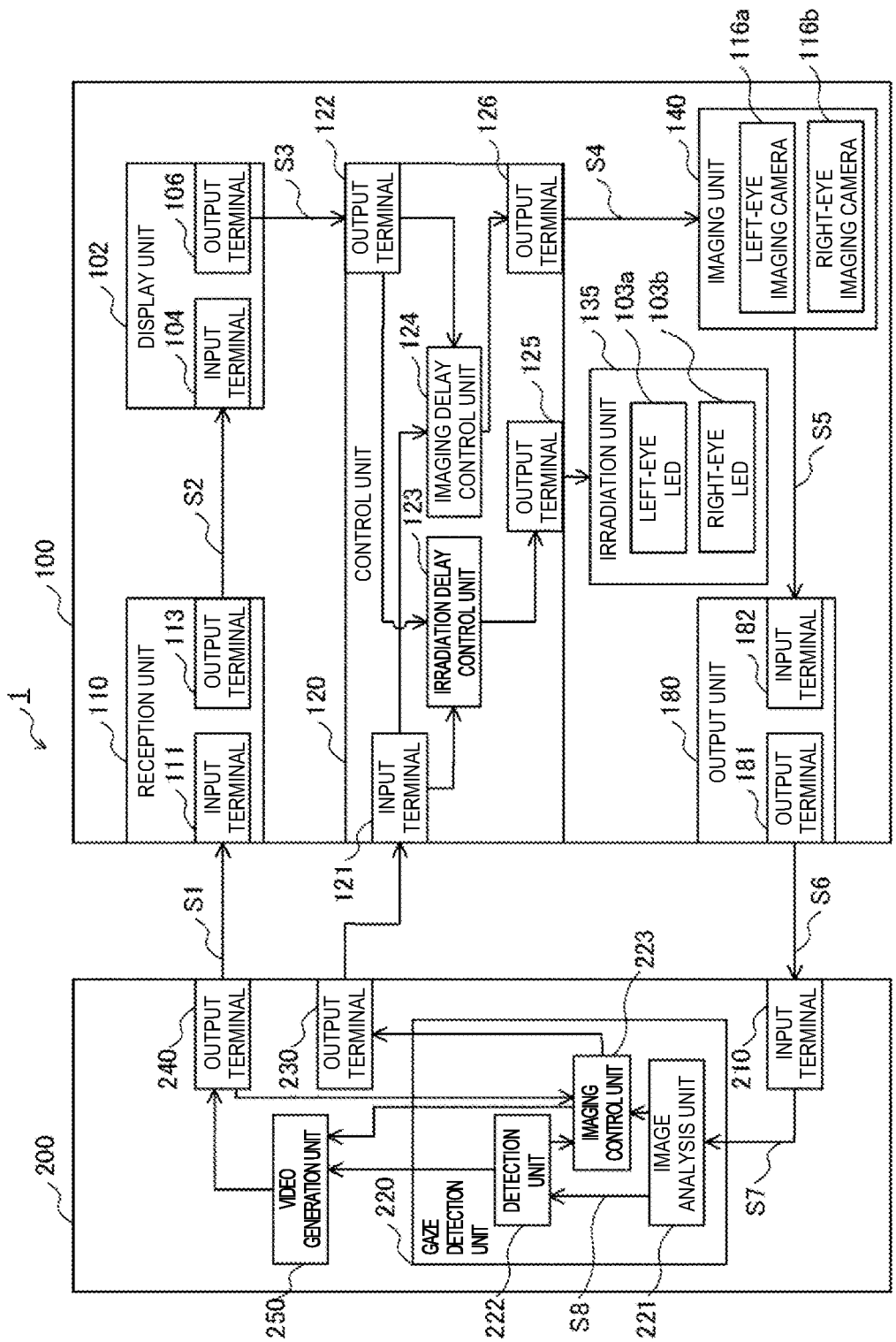
FIG. 1 is a block diagram illustrating a configuration example of a video display system.

As illustrated in FIG. 1, the video display system according to the present invention includes a wearable device 100 including a reception unit 110 that receives a video, a display unit 102 that displays the video received by the reception unit, an irradiation unit 135 that irradiates eyes of a user with near infrared light, and an imaging unit 140 that images the eyes of the user viewing the video displayed on the display unit 102, on the basis of the near infrared light, the user wearing the wearable device and viewing the video; a gaze detection device 200 that detects a gaze point of the user on the basis of a captured image captured by the imaging unit; and a video generation unit 250 that generates a video to be displayed on the wearable device 100 on the basis of the gaze point detected by a gaze detection unit 220, wherein the wearable device 100 includes a control unit 120 that instructs an imaging start timing to the imaging unit 140 so that the imaging of the imaging unit 140 can be executed at a timing at which it is estimated that the user is viewing the frame each time each frame of the video to be displayed on the display unit 102 is displayed.

That is, the video display system 1 can perform imaging at a timing at which it is estimated that the user is actually viewing the video (frames) displayed on the display unit 102 by controlling the imaging timing of the imaging unit 140, and then generate a video (frames) to be viewed next by the user with some room. Hereinafter, the video display system 1 will be described in detail.

Figure 2:
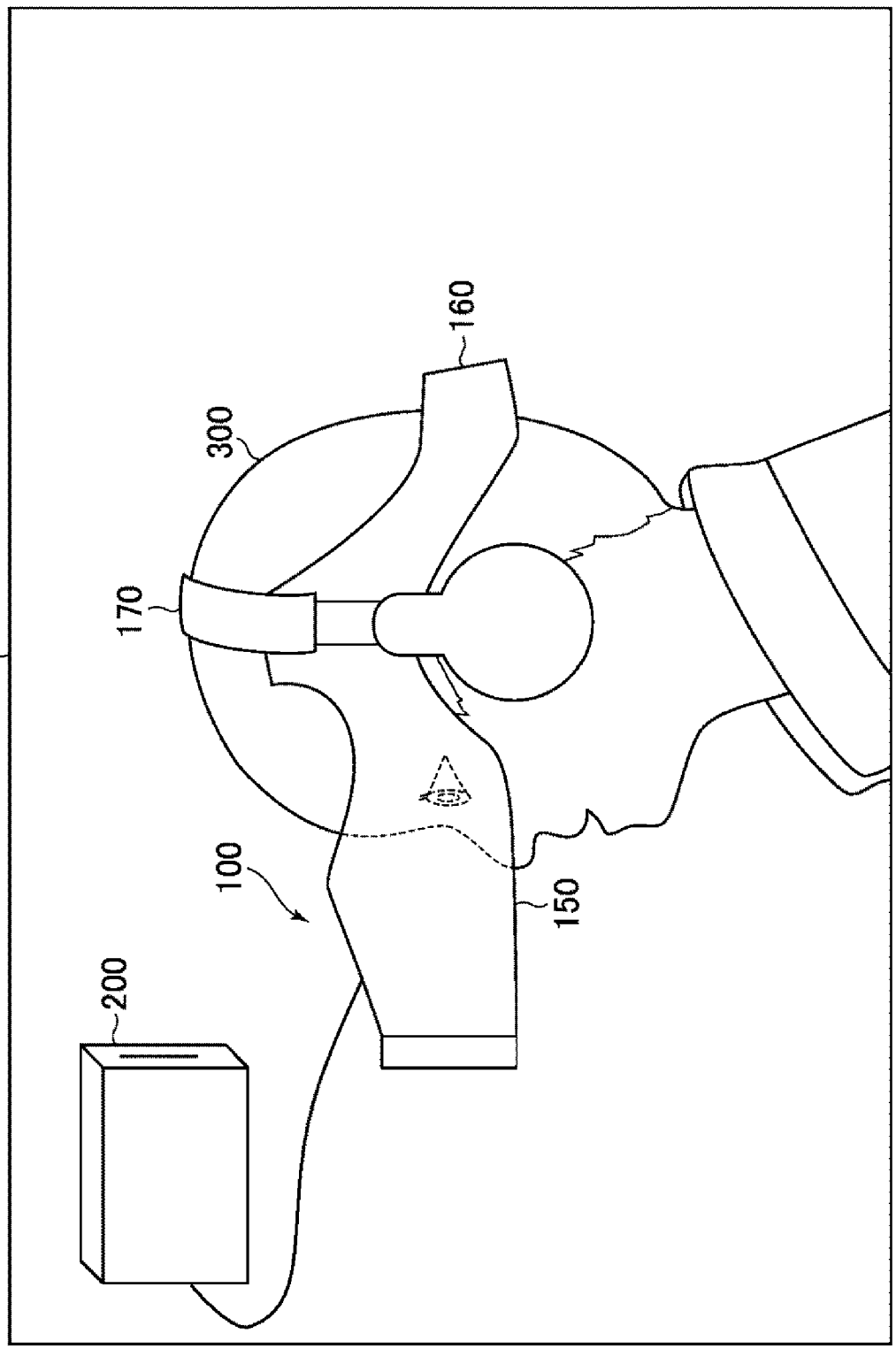
FIG. 2 is an external view illustrating a state in which a head mounted display is worn by a user.

FIG. 2 is a diagram schematically illustrating an overview of the video display system 1 according to the embodiment. The video display system 1 according to the embodiment includes a head mounted display 100 illustrated as an example of a wearable device 100 and a gaze detection device 200. Hereinafter, the wearable device 100 is described as a head mounted display 100. As illustrated in FIG. 2, the head mounted display 100 is mounted on the head of a user 300 for use.

The gaze detection device 200 detects a gaze direction of at least one of the right and left eyes of the user wearing the head mounted display 100, and specifies a focal point of the user, that is, a gaze point of the user in a three-dimensional image displayed on the head mounted display. Further, the gaze detection device 200 also functions as a video generation device that generates videos displayed by the head mounted display 100. For example, the gaze detection device 200 is a device capable of reproducing videos of stationary game machines, portable game machines, PCs, tablets, smartphones, phablets, video players, TVs, or the like, but the present invention is not limited thereto. The gaze detection device 200 is connected wirelessly or by a wire to the head mounted display 100. In the example illustrated in FIG. 2, the gaze detection device 200 is connected to the head mounted display 100 by a cable (for example, a USB cable), but may be wirelessly connected thereto. In the case of the wireless connection, the wireless connection to be executed between the gaze detection device 200 and the head mounted display 100 can be realized using a known wireless communication technique such as Wi-Fi (registered trademark) or Bluetooth (registered trademark). For example, transfer of videos between the head mounted display 100 and the gaze detection device 200 is executed according to a standard such as Miracast (registered trademark), WiGig (registered trademark), or WHDI (registered trademark), and the present invention is not limited thereto.

It should be noted that FIG. 2 illustrates an example in a case in which the head mounted display 100 and the gaze detection device 200 are different devices. However, the gaze detection device 200 may be embedded in the head mounted display 100.

The head mounted display 100 includes a housing 150, a fitting harness 160, and headphones 170. The housing 150 houses an image display system, such as an image display element, for presenting videos to the user 300, and a wireless transfer module (not illustrated) such as a Wi-Fi module or a Bluetooth (registered trademark) module. The fitting harness 160 is used to mount the head mounted display 100 on the head of the user 300. The fitting harness 160 may be realized by, for example, a belt or an elastic band. When the user 300 wears the head mounted display 100 using the fitting harness 160, the housing 150 is arranged at a position where the eyes of the user 300 are covered. Thus, if the user 300 wears the head mounted display 100, a field of view of the user 300 is covered by the housing 150.

The headphones 170 output audio for the video that is reproduced by the gaze detection device 200. The headphones 170 may not be fixed to the head mounted display 100. Even when the user 300 wears the head mounted display 100 using the fitting harness 160, the user 300 may freely attach or detach the headphones 170.

Figure 3:
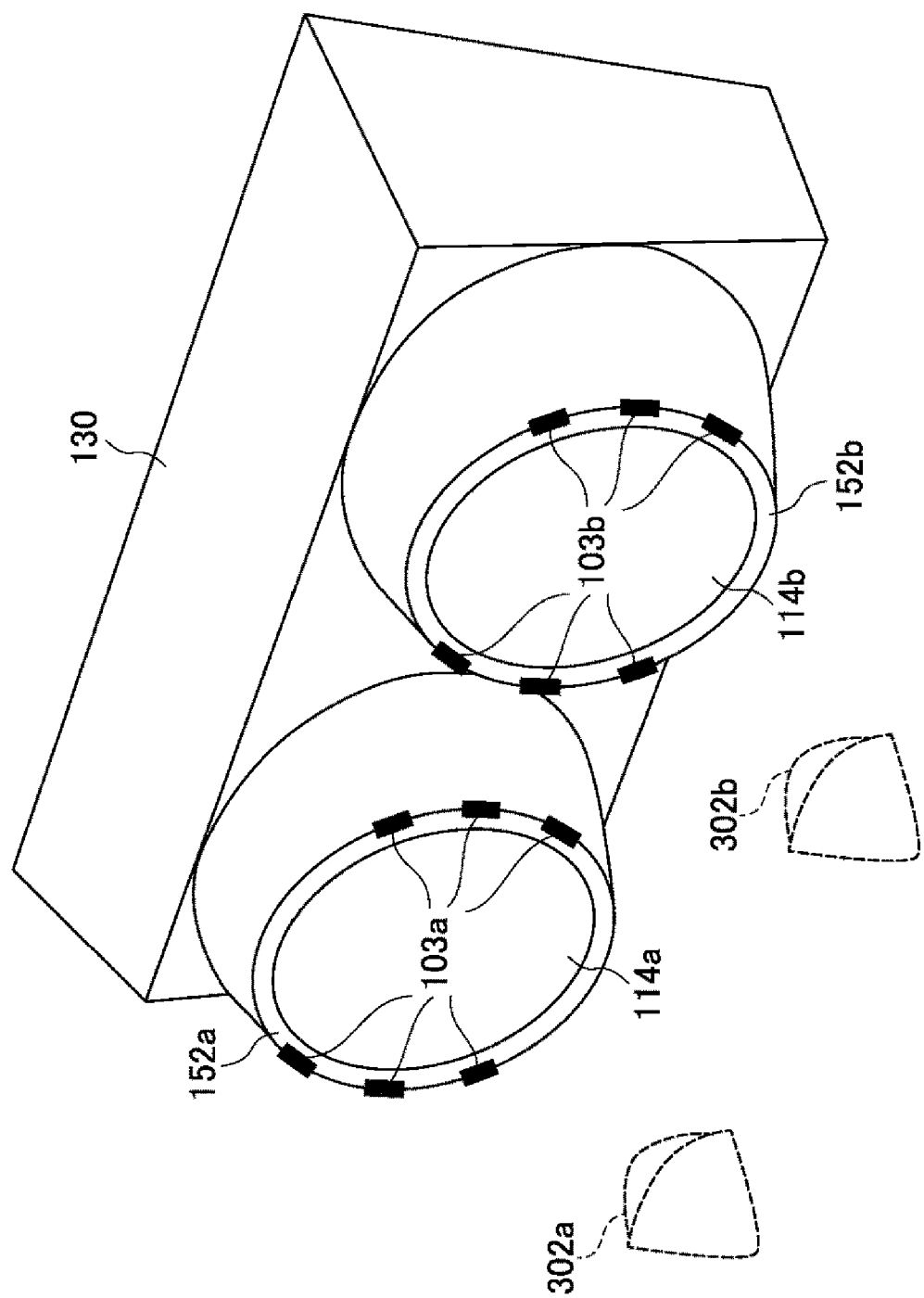
FIG. 3 is a perspective view schematically illustrating an overview of an image display system of a head mounted display.

FIG. 3 is a perspective diagram illustrating an overview of the image display system 130 of the head mounted display 100 according to the embodiment. Specifically, FIG. 3 illustrates a region of the housing 150 according to an embodiment that faces corneas 302 of the user 300 when the user 300 wears the head mounted display 100.

As illustrated in FIG. 3, a convex lens 114a for the left eye is arranged at a position facing the cornea 302a of the left eye of the user 300 when the user 300 wears the head mounted display 100. Similarly, a convex lens 114b for a right eye is arranged at a position facing the cornea 302b of the right eye of the user 300 when the user 300 wears the head mounted display 100. The convex lens 114a for the left eye and the convex lens 114b for the right eye are gripped by a lens holder 152a for the left eye and a lens holder 152b for the right eye, respectively.

Hereinafter, in this specification, the convex lens 114a for the left eye and the convex lens 114b for the right eye are simply referred to as a "convex lens 114" unless the two lenses are particularly distinguished. Similarly, the cornea 302a of the left eye of the user 300 and the cornea 302b of the right eye of the user 300 are simply referred to as a "cornea 302" unless the corneas are particularly distinguished. The lens holder 152a for the left eye and the lens holder 152b for the right eye are referred to as a "lens holder 152" unless the holders are particularly distinguished.

A plurality of infrared light sources 103 are included in the lens holders 152. For the purpose of brevity, in FIG. 3, the infrared light sources that irradiate the cornea 302a of the left eye of the user 300 with infrared light are collectively referred to as infrared light sources 103a, and the infrared light sources that irradiate the cornea 302b of the right eye of the user 300 with infrared light are collectively referred to as infrared light sources 103b. Hereinafter, the infrared light sources 103a and the infrared light sources 103b are referred to as "infrared light sources 103" unless the infrared light sources 103a and the infrared light sources 103b are particularly distinguished. In the example illustrated in FIG. 3, six infrared light sources 103a are included in the lens holder 152a for the left eye. Similarly, six infrared light sources 103b are included in the lens holder 152b for the right eye. Thus, the infrared light sources 103 are not directly arranged in the convex lenses 114, but are arranged in the lens holders 152 that grip the convex lenses 114, making the attachment of the infrared light sources 103 easier. This is because machining for attaching the infrared light sources 103 is easier than for the convex lenses 114 that are made of glass or the like since the lens holders 152 are typically made of a resin or the like.

As described above, the lens holders 152 are members that grip the convex lenses 114. Therefore, the infrared light sources 103 included in the lens holders 152 are arranged around the convex lenses 114. Although there are six infrared light sources 103 that irradiate each eye with infrared light herein, the number of the infrared light sources 103 is not limited thereto. There may be at least one light source 103 for each eye, and two or more light sources 103 are desirable.

Figure 4:
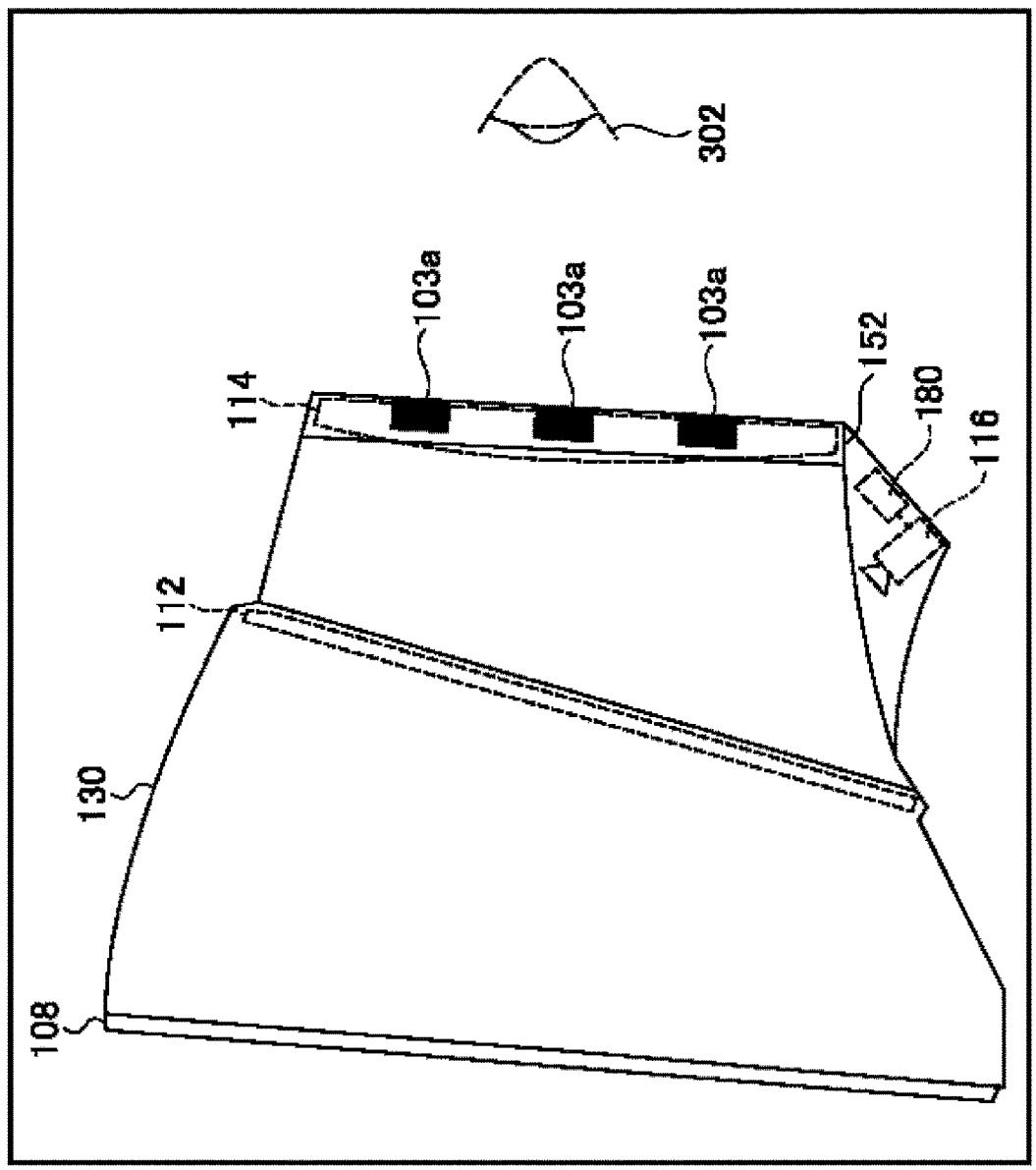
FIG. 4 is a diagram schematically illustrating an optical configuration of an image display system of a head mounted display.

FIG. 4 is a schematic diagram of an optical configuration of the image display system 130 contained in the housing 150 according to the embodiment, and is a diagram illustrating a case in which the housing 150 illustrated in FIG. 3 is viewed from a side surface on the left eye side. The image display system 130 includes infrared light sources 103, an image display element 108, a hot mirror 112, the convex lenses 114, a camera 116, and an output unit 180.

The infrared light sources 103 are light sources capable of emitting light in a near-infrared wavelength region (700 nm to 2500 nm range). Near-infrared light is generally light in a wavelength region of non-visible light that cannot be observed by the naked eye of the user 300.

The image display element 108 displays an image to be presented to the user 300. An image to be displayed by the image display element 108 is generated by the video generation unit 232 in the gaze detection device 200. The video generation unit 232 will be described below. The image display element 108 can be realized by using, for example, a known liquid crystal display (LCD) or an organic electro luminescence display (EL display).

The hot mirror 112 is arranged between the image display element 108 and the cornea 302 of the user 300 when the user 300 wears the head mounted display 100. The hot mirror 112 has a property of transmitting visible light created by the image display element 108, but reflecting near-infrared light.

The convex lenses 114 are arranged on the opposite side of the image display element 108 with respect to the hot mirror 112. In other words, the convex lenses 114 are arranged between the hot mirror 112 and the cornea 302 of the user 300 when the user 300 wears the head mounted display 100. That is, the convex lenses 114 are arranged at positions facing the corneas 302 of the user 300 when the user 300 wears the head mounted display 100.

The convex lenses 114 condense image display light that is transmitted through the hot mirror 112. Thus, the convex lenses 114 function as image magnifiers that enlarge an image created by the image display element 108 and present the image to the user 300. Although only one of each convex lens 114 is illustrated in FIG. 3 for convenience of description, the convex lenses 114 may be lens groups configured by combining various lenses or may be a plano-convex lens in which one surface has curvature and the other surface is flat.

A plurality of infrared light sources 103 are arranged around the convex lens 114. The infrared light sources 103 emit infrared light toward the cornea 302 of the user 300.

Although not illustrated in the figure, the image display system 130 of the head mounted display 100 according to the embodiment includes two image display elements 108, and can independently generate an image to be presented to the right eye of the user 300 and an image to be presented to the left eye of the user. Accordingly, the head mounted display 100 according to the embodiment may present a parallax image for the right eye and a parallax image for the left eye to the right and left eyes of the user 300. Thereby, the head mounted display 100 according to the embodiment can present a stereoscopic video that has a feeling of depth for the user 300.

As described above, the hot mirror 112 transmits visible light but reflects near-infrared light. Thus, the image light emitted by the image display element 108 is transmitted through the hot mirror 112, and reaches the cornea 302 of the user 300.

The infrared light reaching the cornea 302 of the user 300 is reflected by the cornea 302 of the user 300 and is directed to the convex lens 114 again. This infrared light is transmitted through the convex lens 114 and is reflected by the hot mirror 112. The camera 116 includes a filter that blocks visible light and images the near-infrared light reflected by the hot mirror 112. That is, the camera 116 is a near-infrared camera which images the near-infrared light emitted from the infrared light sources 103 and reflected by the cornea of the eye of the user 300.

Although not illustrated in the figure, the image display system 130 of the head mounted display 100 according to the embodiment includes two cameras 116, that is, a left-eye imaging camera 116a that captures an image including the infrared light reflected by the right eye and a right-eye imaging camera 116b that captures an image including the infrared light reflected by the left eye. Thereby, images for detecting gaze directions of both the right eye and the left eye of the user 300 can be acquired.

The output unit 180 outputs the image captured by the camera 116 to the gaze detection device 200 that detects the gaze direction of the user 300. Specifically, the output unit 180 transmits the image captured by the camera 116 to the gaze detection device 200. Although the gaze detection unit 220 will be described below in detail, the gaze direction unit is realized by a gaze detection program executed by a central processing unit (CPU) of the gaze detection device 200. When the head mounted display 100 includes computational resources such as a CPU or a memory, the CPU of the head mounted display 100 may execute the program that realizes the gaze direction detection unit.

As will be described below in detail, bright spots caused by near-infrared light reflected by the cornea 302 of the user 300 and an image of the eyes including the cornea 302 of the user 300 observed in a near-infrared wavelength region are captured in the image captured by the camera 116. The near-infrared light from the infrared light source has some degree of directivity, but also radiates a certain degree of diffused light, and the image of the eyes of the user 300 is captured with the diffused light.

Although the configuration for presenting the image to the left eye of the user 300 in the image display system 130 according to the embodiment has mainly been described above, a configuration for presenting an image to the right eye of the user 300 is the same as above.

Referring back to FIG. 1, FIG. 1 is a block diagram illustrating a detailed configuration of the video display system 1. As illustrated in FIG. 1, the video display system 1 includes a head mounted display 100 and a gaze detection device 200.

As illustrated in FIG. 1, the head mounted display 100 includes a reception unit 110, a display unit 102, a control unit 120, an irradiation unit 135, an imaging unit 140, and an output unit 180. The reception unit 110, the display unit 102, the control unit 120, the irradiation unit 135, the imaging unit 140, and the output unit 180 are realized by different circuits, and are connected as shown in FIG. 1.

The reception unit 110 has a function of receiving video data to be displayed on the display unit 102. The reception unit 110 includes an input terminal 111 and an output terminal 113. The input terminal 111 receives video data as, for example, a video signal. The reception unit 110 converts the received video signal into a mobile industry processor interface (MIPI) format. The converted video signal is output from the output terminal 113 and transferred to the display unit 102. The reception unit 110 is an input interface that receives video data, and the input terminal 111 may be, for example, a USB terminal. It should be noted that although the received video signal is converted to the MIPI format herein, this is only an example, and the signal may be converted into a signal in other formats such as a low voltage differential signaling (LVDS) signal or a baseband signal. The same apply below. Also, for the input terminal, the USB terminal is merely an example, the input terminal may be another terminal or input mechanism, or HDMI (registered trademark) (High Definition Multimedia Interface), a display port, a wireless communication chip, or the like may be used.

The display unit 102 is a display unit having a function of displaying the video data received by the reception unit 110. The display unit 102 receives the transferred video signal in a MIPI format at the input terminal 104 and displays an image based on the received video signal on the image display element 108. In addition, the display unit 102 uses a vertical synchronization signal as a writing start trigger, outputs the vertical synchronization signal, and also outputs from the output terminal 106 to the control unit 120. It should be noted that although the configuration in which the vertical synchronization signal is output from the output terminal 106 is illustrated herein, a configuration in which the vertical synchronization signal is output from the synchronization output of the reception unit 110 to the control unit 120 may be used. In addition, the display unit 102 displays the marker image output from the video generation unit 250 at the designated coordinates of the image display element 108.

The control unit 120 has a function of controlling the timing of imaging in the imaging unit 140. The control unit 120 also has a function of controlling the timing of irradiation with the near-infrared light from the infrared light source 103 by the irradiation unit 135. The control unit 120 includes an input terminal 121, an input terminal 122, an irradiation delay control unit 123, an imaging delay control unit 124, an output terminal 125, and an output terminal 126. The control unit 120 is, for example, a microprocessor.

The input terminal 121 is a terminal for connection to the gaze detection device 200, and receives the viewing timing from the gaze detection device 200, and transfers the viewing timing to the irradiation delay control unit 123 and the imaging delay control unit 124. Here, the viewing timing is information on a time when the user 300 actually views content of one frame of the video displayed on the display unit 102 and the gaze point is determined. The time of the viewing timing is changed (before and after) due to a difference in reaction speed by the user 300.

The input terminal 122 is a terminal for receiving the vertical synchronization signal output from the display unit 102, and transfers the timing for receiving the signal to the imaging delay control unit 124.

The irradiation delay control unit 123 has a function of controlling an irradiation timing for irradiating the eyes of the user 300 with near infrared light using the left eye LED 103a and the right eye LED 103b of the irradiation unit 135. Specifically, the irradiation delay control unit 123 generates an irradiation timing signal so that the eyes of the user are irradiated with infrared light at the imaging timing on the basis of the viewing timing transferred from the input terminal 121 and the timing of the vertical synchronization signal transferred from the input terminal 122, and transfers the irradiation timing signal to the output terminal 125. It is desirable for the irradiation timing to be slightly earlier than the imaging timing of the imaging unit 140. It should be noted that the irradiation timing strictly indicates a timing for irradiating the eyes of the user with the near-infrared light at a timing for imaging the eyes of the user in the next frame of the video data. By controlling the timing for irradiating the eyes of the user with the near-infrared light from the infrared light source 103 (the LEDs 103a and 103b) and performing ON/OFF, it is possible to achieve power saving in the irradiation unit 135.

The imaging delay control unit 124 has a function of controlling the timing at which the imaging unit 140 images the eyes of the user with the left-eye imaging camera 116a and the right-eye imaging camera 116b. The imaging delay control unit 124 generates the imaging timing signal indicating the imaging timing at which the imaging unit 140 starts imaging on the basis of the viewing timing transferred from the input terminal 121 and the timing of the vertical synchronization signal transferred from the input terminal 122, and transmits the imaging timing signal to the output terminal 126. The imaging timing signal is a signal for instructing activation of imaging so that imaging is performed at a timing at which the user 300 actually views one frame of the video displayed by the display unit 102 and the gaze point is determined. It should be noted that the imaging timing strictly indicates a timing at which the eyes of the user is imaged in the next frame of the video data.

The output terminal 125 has a function of transferring the transferred irradiation timing signal to the irradiation unit 135.

The output terminal 126 has a function of transferring the transferred imaging timing signal to the imaging unit 140.

The irradiation unit 135 has a function of irradiating the eyes of the user with the near-infrared light. The irradiation unit 135 includes a left eye LED (near infrared light source) 103a and a right eye LED (near infrared light source) 103b. The irradiation unit 135 turns on the left eye LED 103a and the right eye LED 103b according to the irradiation timing signal transferred from the output terminal 125.

The imaging unit 140 has a function of imaging the eyes of the user 300 on the basis of the near infrared light radiated by the irradiation unit 135. The imaging unit 140 includes a left-eye imaging camera 116a and a right-eye imaging camera 116b. The imaging unit 140 activates the left-eye imaging camera 116a and the right-eye imaging camera 116b according to the imaging timing signal transferred from the output terminal 126, and images the eyes of the user 300 viewing the video. The imaging unit 140 transfers the captured image to the output unit 180. It should be noted that the control of the imaging timing may be controlling a timing at which a global shutter is opened.

The output unit 180 is an interface having a function of outputting the captured image captured by the imaging unit 140 to the gaze detection device 200. The output unit 180 includes an input terminal 182 and an output terminal 181. The output unit 180 transfers the captured image received from the imaging unit 140 at the input terminal 182 to the gaze detection device 200 via the output terminal 181. The output terminal 181 can be realized by, for example, a USB terminal.

The above is the configuration of the head mounted display 100. Next, the gaze detection device 200 will be described.

The gaze detection device 200 includes an input terminal 210, a gaze detection unit 220, a video generation unit 250, an output terminal 230, and an output terminal 240.

The input terminal 210 is a terminal for receiving an input of the captured image transmitted from the head mounted display 100. The input terminal 210 can be realized by, for example, a USB terminal. The input terminal 210 transfers the received captured image to the gaze detection unit 220.

The gaze detection unit 220 has a function of detecting the gaze of the user 300 on the basis of the transferred captured image. The gaze detection unit 220 can be realized by, for example, a microprocessor. The gaze detection unit 220 includes an image analysis unit 221, a detection unit 222, and an imaging control unit 223.

The image analysis unit 221 specifies a corneal position of the user 300 or the like from the transferred captured image.

The detection unit 222 detects a gaze point in the image of the user 300 using an analysis result of the captured image of the image analysis unit 221. The detection unit 222 transfers the detected gaze point to the video generation unit 250.

The imaging control unit 223 specifies a time required for the user 300 to actually view the displayed video and transfers the time to the output terminal 230 as the viewing timing. For example, the imaging control unit 223 uses a default value as a predetermined time required until a person generally clearly views a target or a delay estimation value obtained from a time interval between an image change timing and a gaze point change timing to specify a time required for viewing.

Further details of the scheme of detecting the gaze of the user 300 in the gaze detection unit 220 will be described below.

The video generation unit 250 generates video data of the next frame on the basis of the gaze point of the user 300 transferred from the detection unit 222. For example, the video generation unit 250 generates video data of a predetermined range (for example, a display range in which a video can be displayed on the image display element 108 of the head mounted display 100) around the gaze point of the user 300. Further, the video generation unit 250 may generate, for example, the video data with the predetermined range around the gaze point of the user 300 being at a high resolution and the outside of the predetermined range being at a low resolution. The generated video data is transferred to the output terminal 240.

The output terminal 230 has a function of transferring the viewing timing transferred from the imaging control unit 223 to the head mounted display 100. The output terminal 230 can be realized by, for example, a USB terminal.

The output terminal 240 has a function of transferring the video data transferred from the video generation unit 250 to the head mounted display 100 as a video signal. The output terminal 240 can be realized by, for example, a USB terminal, but HDMI, a display port, and the like can be used, similar to the input terminal. Further, the output terminal 240 transfers a video data output timing to the imaging control unit 223. Accordingly, the imaging control unit 223 can transfer the viewing timing in synchronization with the video data to be output, and therefore, the head mounted display 100 can realize imaging synchronized with the video data output from the gaze detection device 200.

The above is the description of the configuration of the gaze detection device 200. Next, the detection of the gaze point of the user will be described.

Figure 5:
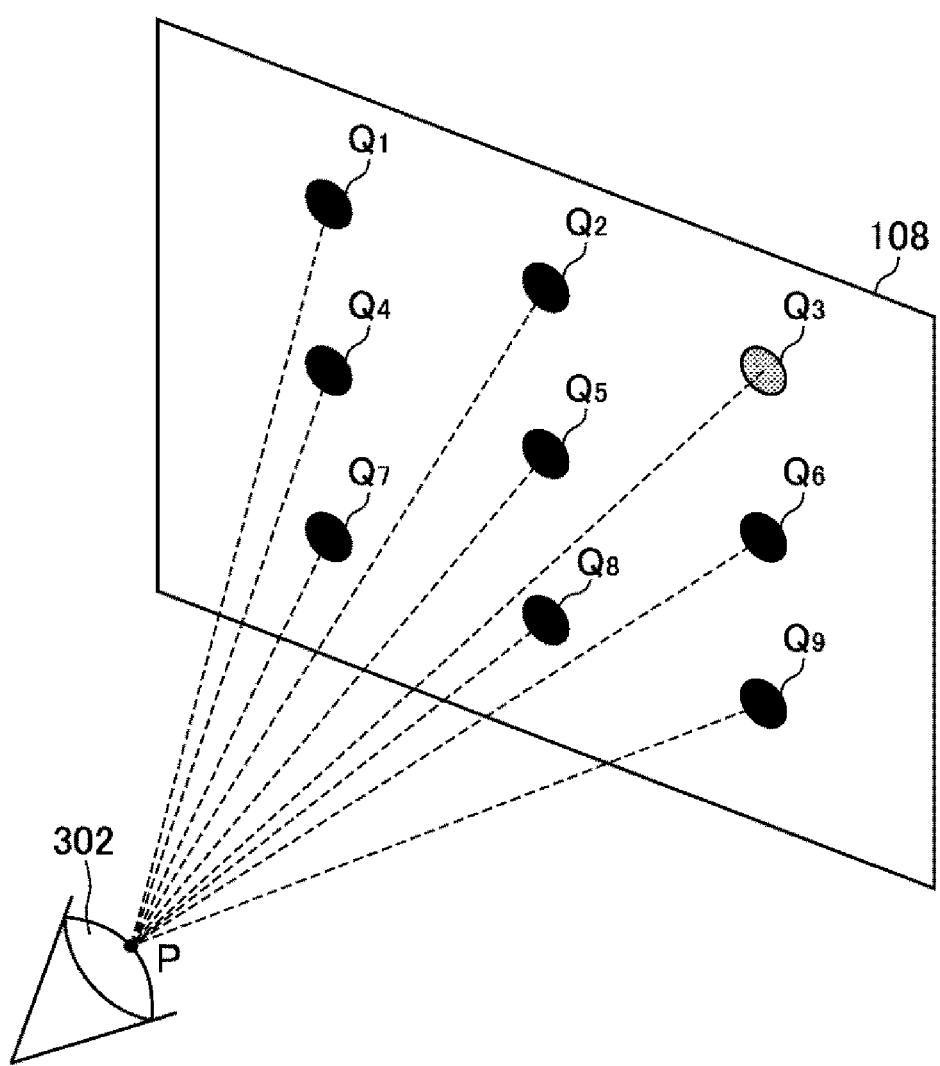
FIG. 5 is a schematic diagram illustrating calibration for detection of a gaze direction.

FIG. 5 is a schematic diagram illustrating calibration for detecting the gaze direction according to the embodiment. The gaze direction of the user 300 is realized by the gaze detection unit 220 in the gaze detection device 200 analyzing the video captured by the camera 116 and output to the gaze detection device 200 by the output unit 180.

The video generation unit 232 generates nine points (marker images) including points $Q_1$ to $Q_9$ as illustrated in FIG. 5, and causes the points to be displayed by the image display element 108 of the head mounted display 100. The gaze detection device 200 causes the user 300 to sequentially gaze at the points $Q_1$ up to $Q_9$. In this case, the user 300 is requested to gaze at each of the points by moving his or her eyeballs as much as possible without moving his or her neck. The camera 116 captures images including the cornea 302 of the user 300 when the user 300 is gazing at the nine points including the points $Q_1$ to $Q_9$.

Figure 6:
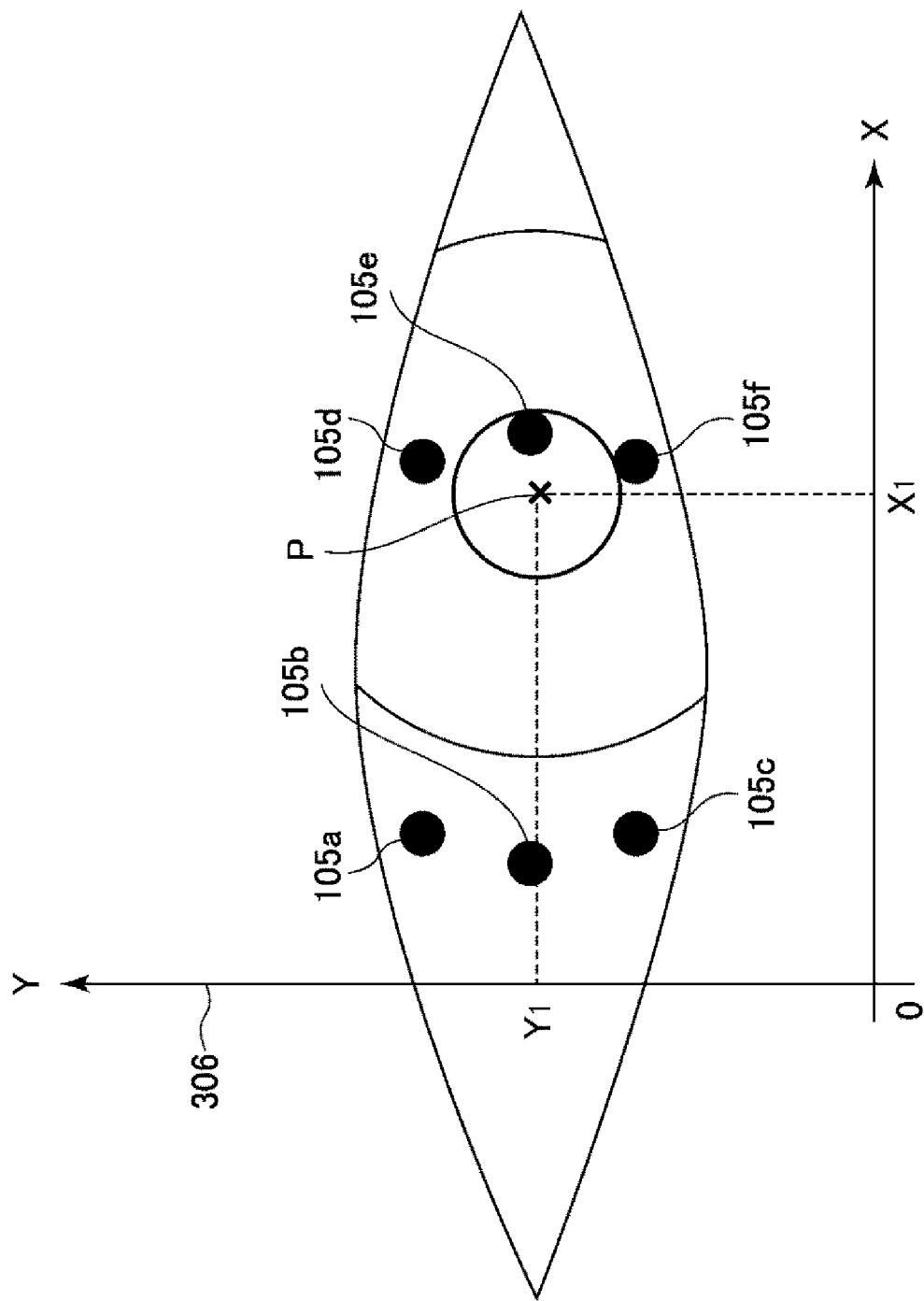
FIG. 6 is a schematic diagram illustrating position coordinates of a cornea of a user.

FIG. 6 is a schematic diagram illustrating the position coordinates of the cornea 302 of the user 300. The gaze detection unit 220 in the gaze detection device 200 analyzes the images captured by the camera 116 and detects bright spots 105 derived from the infrared light. When the user 300 gazes at each point by moving only his or her eyeballs, the positions of the bright spots 105 are considered to be stationary regardless of the point at which the user gazes. Thus, on the basis of the detected bright spots 105, the gaze detection unit 220 sets a two-dimensional coordinate system 306 in the image captured by the camera 116.

Further, the gaze detection unit 220 detects the center P of the cornea 302 of the user 300 by analyzing the image captured by the camera 116. This is realized by using known image processing such as the Hough transform or an edge extraction process. Accordingly, the gaze detection unit 220 can acquire the coordinates of the center P of the cornea 302 of the user 300 in the set two-dimensional coordinate system 306.

In FIG. 5, the coordinates of the points $Q_1$ to $Q_9$ in the two-dimensional coordinate system set for the display screen displayed by the image display element 108 are $Q_1(x_1, y_1)^T, Q_2(x_2, y_2)^T, \ldots, Q_9(x_9, y_9)^T$, respectively. The coordinates are, for example, a number of a pixel located at a center of each point. Further, the center points P of the cornea 302 of the user 300 when the user 300 gazes at the points $Q_1$ to $Q_9$ are labeled $P_1$ to $P_9$. In this case, the coordinates of the points P1 to P9 in the two-dimensional coordinate system 306 are $P_1(X_1, Y_1)^T$, $P_2(X_2, Y_2)^T$, ..., $P_9(X_9, Y_9)^T$. T represents a transposition of a vector or a matrix.

A matrix M with a size of 2×2 is defined as Equation (1) below.

$$M = \begin{pmatrix} m_{11} & m_{12} \\ m_{21} & m_{22} \end{pmatrix} \quad (1)$$

In this case, if the matrix M satisfies Equation (2) below, the matrix M is a matrix for projecting the gaze direction of the user 300 onto an image plane that is displayed by the image display element 108.

$$Q_N = MP_N (N=1, \ldots, 9) \quad (2)$$

When Equation (2) is written specifically, Equation (3) below is obtained.

$$\begin{pmatrix} x_1 & x_2 & \ldots & x_9 \\ y_1 & y_2 & \ldots & y_9 \end{pmatrix} = \begin{pmatrix} m_{11} & m_{12} \\ m_{21} & m_{22} \end{pmatrix} \begin{pmatrix} X_1 & X_2 & \ldots & X_9 \\ Y_1 & Y_2 & \ldots & Y_9 \end{pmatrix} \quad (3)$$

By transforming Equation (3), Equation (4) below is obtained.

$$\begin{pmatrix} x_1 \\ x_2 \\ \vdots \\ x_9 \\ y_1 \\ y_2 \\ \vdots \\ y_9 \end{pmatrix} = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix} \begin{pmatrix} m_{11} \\ m_{12} \\ m_{21} \\ m_{22} \end{pmatrix} \quad (4)$$

Here, $$y = \begin{pmatrix} x_1 \\ x_2 \\ \vdots \\ x_9 \\ y_1 \\ y_2 \\ \vdots \\ y_9 \end{pmatrix}, A = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix}, x = \begin{pmatrix} m_{11} \\ m_{12} \\ m_{21} \\ m_{22} \end{pmatrix}$$

If,
Equation (5) below is obtained:

$$y = Ax \quad (5)$$

In Equation (5), elements of the vector y are known since these are coordinates of the points $Q_1$ to $Q_9$ that are displayed on the image display element 108 by the gaze detection unit 220. Further, the elements of the matrix A can be acquired since the elements are coordinates of a vertex P of the cornea 302 of the user 300. Thus, the gaze detection unit 220 can acquire the vector y and the matrix A. A vector x that is a vector in which elements of a transformation matrix M are arranged is unknown. Since the vector y and matrix A are known, an issue of estimating the matrix M becomes an issue of obtaining the unknown vector x.

Equation (5) becomes the main issue to decide if the number of equations (that is, the number of points Q presented to the user 300 by the gaze detection unit 220 at the time of calibration) is larger than the number of unknown numbers (that is, the number 4 of elements of the vector x). Since the number of equations is nine in the example illustrated in Equation (5), Equation (5) is the main issue to decide.

An error vector between the vector y and the vector Ax is defined as vector e. That is, e=y−Ax. In this case, a vector $x_{opt}$ that is optimal in the sense of minimizing the sum of squares of the elements of the vector e can be obtained from Equation (6) below.

$$x_{opt} = (A^T A)^{-1} A^T y \quad (6)$$

Here, "−1" indicates an inverse matrix.

The gaze detection unit 220 uses the elements of the obtained vector $x_{opt}$ to constitute the matrix M of Equation (1). Accordingly, using the coordinates of the vertex P of the cornea 302 of the user 300 and the matrix M, the gaze detection unit 220 can estimate a point at which the right eye of the user 300 is gazing on the moving image displayed by the image display element 108 according to Equation (2). Here, the gaze detection unit 220 further receives information on a distance between the eye of the user and the image display element 108 from the head mounted display 100 and corrects an estimated coordinate value at which the user gazes according to the distance information. It should be noted that a deviation in the estimation of a gaze position according to the distance between the eye of the user and the image display element 108 may be ignored as an error range. Accordingly, the gaze detection unit 220 can calculate a right-eye gaze vector connecting the gaze point of the right eye on the image display element 108 and the vertex of the cornea of the right eye of the user. Similarly, the gaze detection unit 220 can calculate a left-eye gaze vector connecting the gaze point of the left eye on the image display element 108 and the vertex of the cornea of the left eye of the user. It should be noted that it is possible to specify the gaze point of the user on the two-dimensional plane with the gaze vector of only one eye, and calculate depth direction information of the gaze point of the user by obtaining the gaze vectors of both eyes. Thus, the gaze detection device 200 can specify the gaze point of the user. It should be noted that the method of specifying the gaze point shown herein is only an example, and a gaze point of the user may be specified using a different method.

The above is the configuration of the video display system 1.

<Operation>

Figure 7:
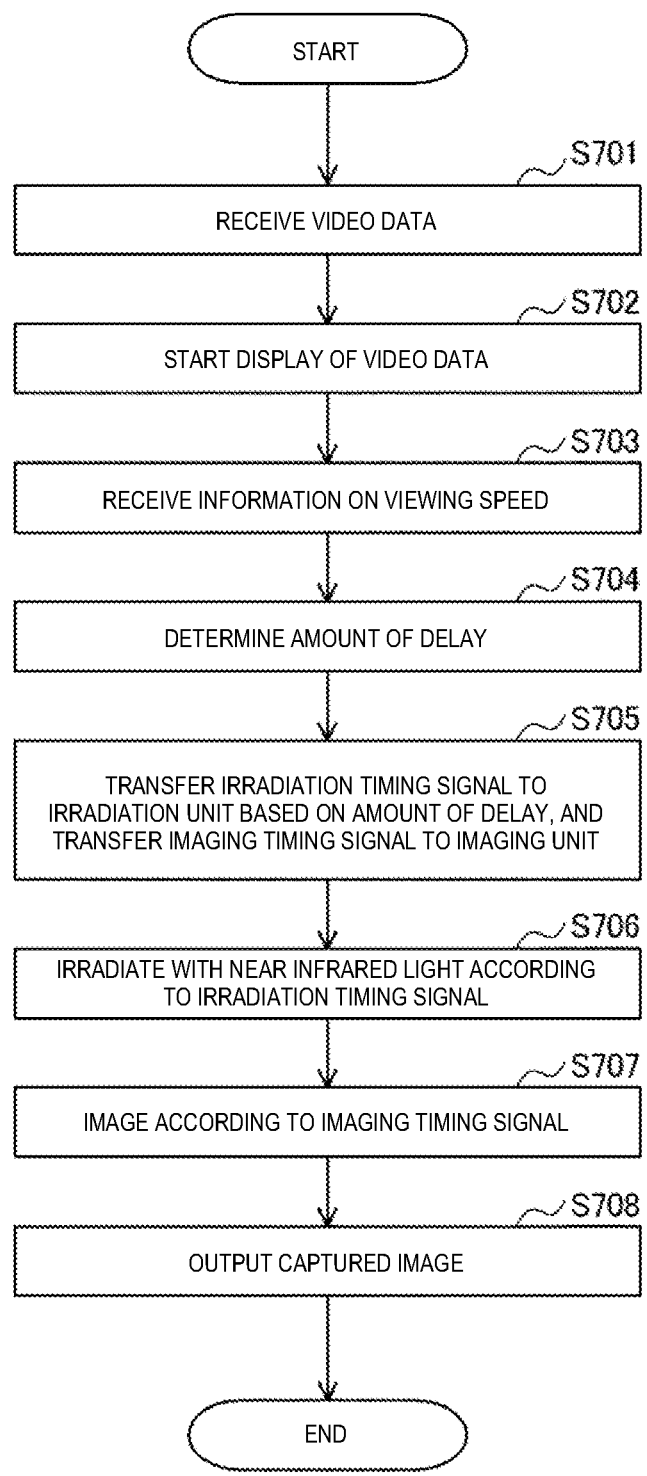
FIG. 7 is a flowchart illustrating an operation example of a video display system.

FIG. 7 is a flowchart illustrating an operation of the head mounted display 100 in the video display system 1. FIG. 7 illustrates an operation of the head mounted display 100 for one frame of video data, and the processing illustrated in FIG. 7 is repeatedly executed.

As illustrated in FIG. 7, first, the reception unit 110 of the head mounted display 100 receives video data from the gaze detection device 200 (step S701). The reception unit 110 converts the received video signal into a signal in an MIPI format and transfers the signal to the display unit 102.

The display unit 102 starts a display of the received video signal in the MIPI format (step S702) and outputs a vertical synchronization signal from the output terminal 106 to the control unit 120. The control unit 120 receives the vertical synchronization signal with the input terminal 122.

On the other hand, the input terminal 121 of the control unit 120 receives an input of the viewing timing of the user 300 from the gaze detection unit 220 (step S703). The input terminal 121 transfers the received viewing timing to the irradiation delay control unit 123 and the imaging delay control unit 124.

The irradiation delay control unit 123 determines the amount of delay in the next frame on the basis of the transferred viewing timing. In addition, the imaging delay control unit 124 determines the amount of delay in the next frame on the basis of the transferred viewing timing and the timing of the vertical synchronization signal (step S704). That is, the imaging delay control unit 124 adds a time from start of video display to the actual viewing by the user to the transferred vertical synchronization signal on the basis of the viewing timing, subtracts a time required for actual imaging from the start of imaging, and adds a time corresponding to one cycle of the frame in the video data when a subtraction result is a negative value to generate the imaging timing signal. It should be noted that, after periodicity for the timing of the irradiation and the imaging is established, the irradiation delay control unit 123 or the imaging delay control unit 124 may fix a delay time from the vertical synchronization signal and generate the irradiation timing signal or the imaging timing signal.

The control unit 120 transfers the irradiation timing signal generated on the basis of the determined amount of delay to the irradiation unit 135, and transfers the generated imaging timing signal to the imaging unit 140 (step S705).

The irradiation unit 135 turns on the left eye LED 103a and the right eye LED 103b at the timing indicated by the transferred irradiation timing signal, and irradiates the eyes of the user 300 with near infrared light (step S706).

In addition, the imaging unit 140 starts imaging of the eyes of the user using the left-eye imaging camera 116a and the right-eye imaging camera 116b at the timing indicated by the transferred imaging timing signal to obtain a captured image (step S707).

The imaging unit 140 transfers the captured image to the output unit 180, and the output unit 180 outputs the transferred captured image to the gaze detection device 200 (step S708).

Accordingly, it is possible to obtain a captured image obtained by imaging the eyes of the user corresponding to one frame. In the gaze detection device 200 having received the captured image, the image analysis unit 221 performs analysis to specify a cornea position in the image of the user 300, and the detection unit 222 receives an analysis result of the image analysis unit 221 to specify a gaze point of the user 300. The video generation unit 250 generates video data of the next frame on the basis of the gaze point detected by the gaze detection unit 220, and outputs the video data from the output terminal 240 to the head mounted display 100. Further, at the same time, the imaging control unit 223 generates a viewing timing and transfers the viewing timing to the control unit 120 of the head mounted display 100 in synchronization with the output of the video data.

The above is the operation of the video display system 1.
<Specific Example>

An operation of the video display system 1 and effects thereof will be described using one specific example of the signal herein.

Figure 8:
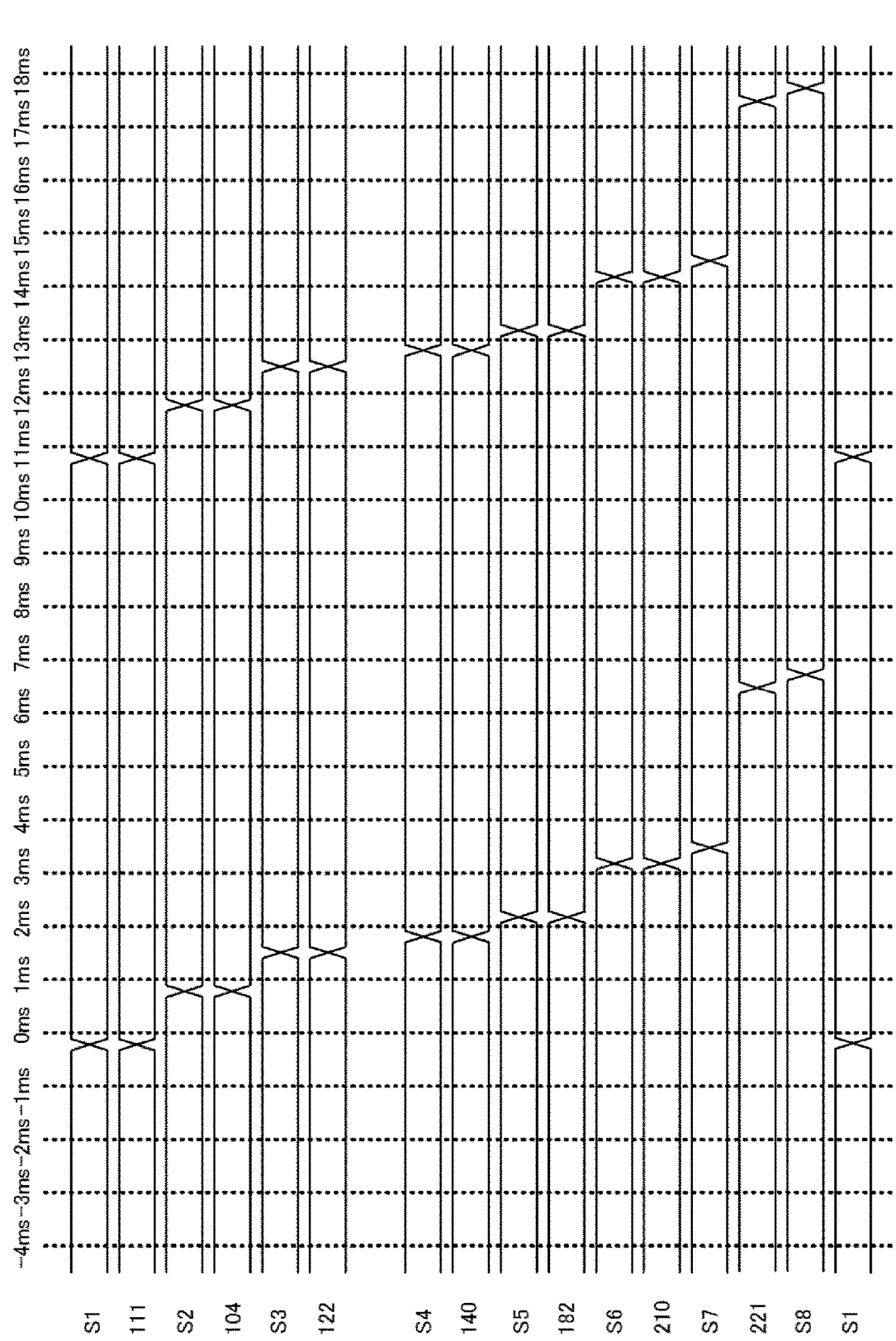
FIG. 8 is a timing chart of a case in which timing control of imaging timing is not performed.
Figure 9:
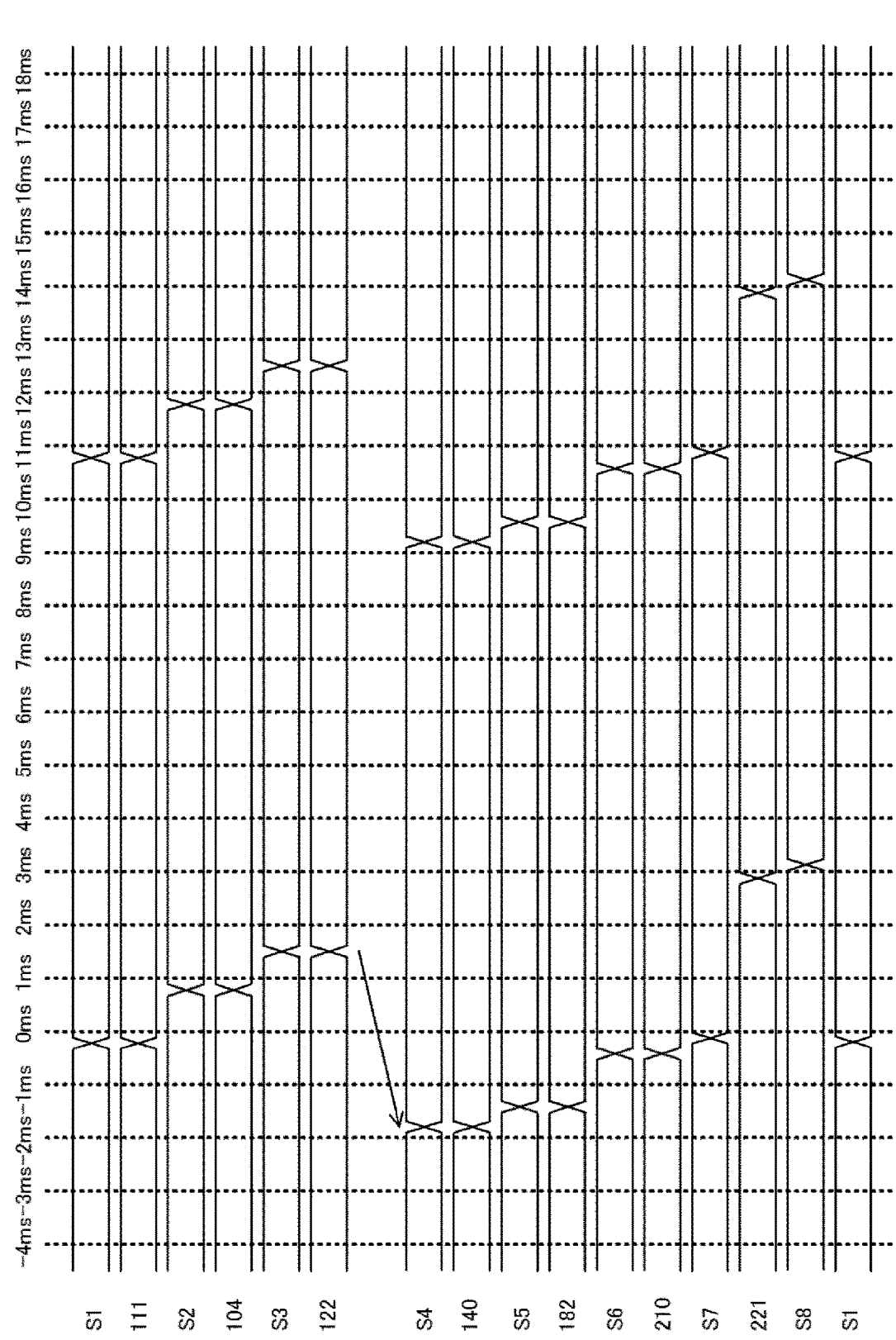
FIG. 9 is a timing chart of a case in which timing control of imaging timing is performed.

FIG. 8 illustrates a timing chart when the imaging timing is not controlled, and FIG. 9 illustrates a timing chart when the imaging timing is controlled. In both drawings, a horizontal axis is a time axis. Here, the passage of time is indicated in the order of ms. Further, in both drawings, a left side indicates which signal is in the video display system 1. In addition, here, it is assumed that a period of a display of one frame of video is 11 ms. That is, in the video display system 1, it is assumed that it is necessary for a process of displaying one frame of the video, imaging the eyes of the user, specifying the gaze point of the user from the captured image, and generating data of one next frame from the specified gaze point to be performed for 11 ms.

In FIGS. 8 and 9, each signal indicates a timing of the signal S1 output from the output terminal 240, a timing at which the input terminal 111 receives a signal, a timing of a signal S2 output from the output terminal 113, a timing at which the input terminal 104 receives a signal, a timing of a signal S3 output from the output terminal 106, a timing at which the input terminal 122 receives a signal, a timing of a signal S4 output from the output terminal 126 of the control unit 120 (a signal defining an imaging start timing), a timing at which the imaging unit 140 receives a signal, a timing of a signal S5 output from the imaging unit 140, which is a timing at which the captured image is output, a timing at which the input terminal 182 receives the captured image, a timing of a signal S6 output from the output terminal 181, which is a timing at which the captured image is transmitted from the head mounted display 100 to the gaze detection device 200, a timing at which the input terminal 210 receives the captured image, a timing of a signal S7 output from the input terminal 210 to the gaze detection unit 220, a timing at which the image analysis unit 221 receives a signal, a timing of a signal S8 output from the image analysis unit 221, and a timing of a signal S1 output from the output terminal 240 in order from top.

As illustrated in FIG. 8 or 9, various processing delays occur in the video display system 1. In the case of FIG. 8, there are delays such as a delay of about 1 ms due to format conversion of the video signal in the reception unit 110 (see the signals S1 and S2 in 0 ms to 1 ms in FIG. 8), a delay of about 1 ms caused between reception of the video data in the display unit 102 and an output of the vertical synchronization signal (see the signal S2 and the signal S3 in 1 ms to 2 ms in FIG. 8), a processing delay of about 0.5 ms in the control unit 120 (see the signal S3 and the signal S4 in 1 ms to 2 ms in FIG. 8), a processing delay of 0.5 ms until the captured image is output by imaging in the imaging unit 140 (see the signal S4 and the signal S5 before and after 2 ms in FIG. 8), a processing delay in the output unit 180 (see the signal S5 and the signal S6 in 2 ms to 3 ms in FIG. 8), a transfer delay of about 0.5 ms from the input terminal 210 to the gaze detection unit 220 (the image analysis unit 221) (see the signal S6 and the signal S7 in 3 ms to 4 ms in FIG. 8), a processing delay of about 3 ms due to the analysis in the image analysis unit 221 (see the signal S7 and 221 in 3 ms to 7 ms in FIG. 8), and a processing delay of about 0.2 ms due to an output process from the image analysis unit 221 (see 221 and signal S8 in 6 ms to 7 ms in FIG. 8). As a result of these delays, the gaze point information is transferred to the video generation unit 250 just before 7 ms in the example of FIG. 8.

Therefore, when the imaging timing control is not performed, the video generation unit 250 has time to prepare video data only for about 4 ms between 7 ms and 11 ms in FIG. 8.

On the other hand, as shown in this present embodiment, it is assumed that the imaging timing control is performed as shown in the timing chart of FIG. 9. That is, it is assumed that the control unit 120 (the imaging delay control unit 124) has performed the control to advance the output of the signal (S4) indicating the imaging start timing as indicated by the arrow in FIG. 9. Then, a timing at which the gaze point is transferred to the video generation unit 250 can be naturally advanced.

Strictly speaking, the signal at 1 ms is used as a trigger, and another signal at a time earlier than that cannot be used as a trigger, and therefore, the imaging start timing of the next frame is actually determined. That is, the imaging delay control unit 124 determines the imaging timing (see the signal S4 at 9 ms in FIG. 9) at which the eyes of the user viewing the next frame are imaged according to the timing of the transferred vertical synchronization signal. The eyes of the user visually recognizing the video data indicated by the signal S1 at 11 ms are imaged on the basis of this imaging timing.

Therefore, by performing the imaging timing control, the information on the gaze point is transferred to the video generation unit 250 earlier in FIG. 9. Therefore, the video generation unit 250 can generate the video data of the next frame over a period of 8 ms between 3 ms and 11 ms, and room can be given for a process of generating the video data in the video generation unit 250.

It should be noted that the amount of delay caused by the various processes or transfers illustrated in FIGS. 8 and 9 is merely an example, and it is apparent that it is necessary to change the imaging start timing indicated by the imaging timing signal according to the amount of delay caused by the respective processes.

<Conclusion>

With the video display system according to the present embodiment, it is possible to instruct start of imaging of the eyes of the user 300 in the imaging unit 140 on the basis of the timing at which the display unit 102 receives new data and starts display thereof (performs vertical synchronization) in advance. Therefore, it is possible to image the eyes of the user exactly at the timing at which the user 300 actually views the displayed video after the start of the vertical synchronization. Accordingly, it is possible to advance the transfer timing of the captured image to the gaze detection unit 220 relative to the start of imaging of the imaging unit 140 from the timing at which the display unit 102 ends the display of the image, and therefore, room can be given for generation of the video data in the video generation unit 250.

<Supplements>

It is apparent that the video display system according to the above embodiment is not limited to the embodiment but may be realized by another scheme. Hereinafter, various modification examples will be described below.

(1) In the above embodiment, the wearable device 100 and the gaze detection device 200 are connected by the USB cable, but the present invention is not limited thereto, but a part or all (a part or all of a path of S1, a path of S6, and a path from the output terminal 230 to the input terminal 121) may be replaced with wireless communication. Further, a cable for connecting the wearable device 100 to the gaze detection device 200 and transferring information may be realized by one cable instead of a plurality of cables as illustrated in FIG. 1.

(2) In the above embodiment, the control unit 120 receives the viewing timing of the user from the gaze detection device 200 and determines the irradiation timing of the imaging unit 140 and the irradiation unit 135. However, the present invention is not limited thereto. The irradiation delay control unit 123 may perform feedforward (feedback) for a fixed time. Similarly, the imaging delay control unit 124 may perform feedforward for a fixed time. Further, alternatively, the control unit 120 may store a plurality of fixed times with different time lengths according to attributes of the user, determine, for example, a fixed time length according to an age of the user as the attributes of the user, and set the fixed time as a feedforward time. The fixed time length may be set to be longer as the age of the user 300 is higher. In addition, a user registration function may be provided in the video display system 1. In this case, it is possible to reduce a process of the imaging control unit 223 by storing the viewing timing of each user in advance.

(3) In the above embodiment, the gaze detection device 200 and the wearable device 100 are described as separate devices, but as described above, the gaze detection device 200 may be embedded in the wearable device 100. Further, in this case, only some of functions of the gaze detection device 200 may be included in the wearable device 100.

(4) In the above-described embodiment, the irradiation unit 135 may turn on the left eye LED 103a and the right eye LED 103b at all times.

(5) Although not shown in the above embodiment, the wearable device 100 may include a storage unit for storing the video data, the viewing timing, and the captured image captured by the imaging unit 140. Similarly, the gaze detection device 200 may also include a storage unit for storing the received captured image and the like.

(6) In the above-described embodiment, a scheme for controlling the timing for imaging the eyes of the user in the gaze detection device is realized by each processor constituting the gaze detection device executing a given function, this may be realized by a logical circuit (hardware) formed of an integrated circuit (an integrated circuit (IC) chip or a large scale integration (LSI)), a field programmable gate array (FPGA), or the like, a dedicated circuit. Further, the circuit may be realized by one or a plurality of integrated circuits, or the functions of the plurality of functional units described above may be realized by one integrated circuit. The LSI may be called VLSI, super LSI, ultra LSI, or the like according to an integration difference. In addition, the control of the imaging timing and the control of the irradiation timing by the control unit 120 may be realized by software by the control unit 120 executing a timing control program (video display program) for timing control.

Further, the timing control program may be recorded in a processor-readable recording medium, and as the recording medium, a "non-transitory tangible medium" such as a tape, a disk, a card, a semiconductor memory, or a programmable logic circuit can be used. Further, the timing control program may be supplied to the processor via any transmission medium (a communication network, broadcast waves, or the like) capable of transmitting the timing control program. In the present invention, the timing control program can also be realized in the form of a data signal embedded in a carrier wave, which is embodied through electronic transmission.

It should be noted that the timing control program may be installed using, for example, a script language such as ActionScript or JavaScript (registered trademark), an object oriented programming language such as Objective-C, Java (registered trademark), C++, or C#, a markup language such as HTML5, or the like.

(7) The respective configurations and respective supplements may be appropriately combined.

EXPLANATION OF REFERENCES

1 Video display system
100 Wearable device (head mounted device)
103a Infrared light source (right eye LED)
103b Infrared light source (left eye LED)

104 Input terminal
105 Bright spot
106 Output terminal
108 Image display element
111 Input terminal
112 Hot mirror
113 Output terminal
114, 114a, 114b Convex lens
116 Camera
116a Right-eye imaging camera
116b Left-eye imaging camera
120 Control unit
121 Input terminal
122 Input terminal
123 Irradiation delay control unit
124 Imaging delay control unit
125 Output terminal
126 Output terminal
130 Image display system
135 Irradiation unit
140 Imaging unit
150 Housing
152a, 152b Lens holding unit
160 Fitting harness
170 Headphone
180 Output unit
181 Output terminal
182 Input terminal
200 Gaze detection device
210 Input terminal
220 Gaze detection unit
221 Image analysis unit
222 Detection unit
223 Imaging control unit
230 Output terminal
240 Output terminal
250 Video generation unit

What is claimed is:

1. A video display system comprising:
a wearable device including
    a reception unit that receives a video,
    a display unit that displays the video received by the reception unit,
    an irradiation unit that irradiates near infrared light to eyes of a user, and
    an imaging unit that images the eyes of the user viewing the video displayed on the display unit, on the basis of the near infrared light, the user wearing the wearable device and viewing the video;
a gaze detection unit that detects a gaze point of the user on the basis of a captured image captured by the imaging unit; and
a video generation unit that generates a video to be displayed on the wearable device on the basis of the gaze point detected by the gaze detection unit,
wherein the wearable device further includes a control unit that instructs the imaging unit to start imaging the eyes of the user to detect the gaze point on a frame of the video at a timing at which it is estimated that the user views the frame.

2. The video display system according to claim 1, wherein:
the reception unit converts video data of the received video into a format for displaying the video on the display unit,
the display unit outputs a synchronization signal indicating start of display of the video data converted by the reception unit, and
the control unit outputs, to the imaging unit, an instruction signal for instructing the imaging unit to start imaging the eyes of the user to detect the gaze point on the frame of the video on the basis of the synchronization signal.

3. The video display system according to claim 2, wherein the control unit outputs the instruction signal according to a period of time from start of display of the frame on the display unit to viewing by the user.

4. The video display system according to claim 1, wherein the control unit further controls a timing at which the irradiation unit irradiates the eyes of the user with the near-infrared light.

5. A video display method comprising:
a reception step of receiving a video;
a display step of displaying the video received in the reception step;
an irradiation step of irradiating near infrared light to eyes of a user;
a control step of instructing to start imaging the eyes of the user to detect the gaze point on a frame of the video at a timing at which it is estimated that the user views the frame;
an imaging step of imaging the eyes of the user viewing the video displayed in the display step, on the basis of the near infrared light according to the instruction;
a gaze detection step of detecting a gaze point of the user on the basis of a captured image captured in the imaging step; and
a video generation step of generating a video to be displayed on the basis of the gaze point detected in the gaze detection step.

6. A video display program causing a computer to execute:
a reception function of receiving a video;
a display function of displaying the video received using the reception function;
an irradiation function of irradiating eyes of a user with near infrared light;
a control function of instructing to start imaging the eyes of the user to detect the gaze point on a frame of the video at a timing at which it is estimated that the user views the frame;
an imaging function of imaging the eyes of the user viewing the video displayed using the display function, on the basis of the near infrared light according to the instruction;
a gaze detection function of detecting a gaze point of the user on the basis of a captured image captured using the imaging function; and
a video generation function of generating a video to be displayed on the basis of the gaze point detected using the gaze detection step.

* * * * *